Nov. 4, 1952 — C. B. HUTCHINGS — 2,616,392
VETERINARY PEN
Filed Dec. 24, 1949 — 2 SHEETS—SHEET 2

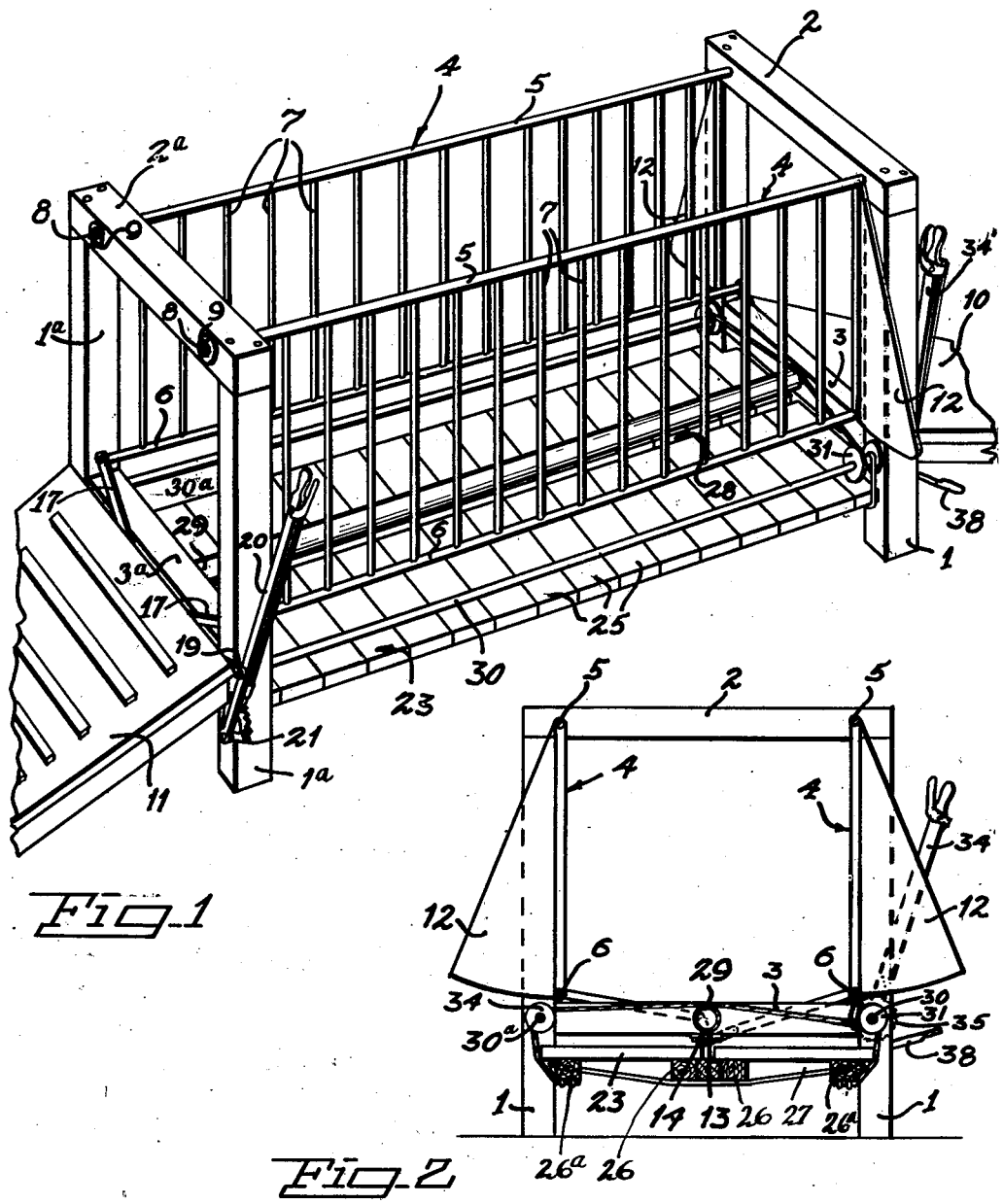

Inventor
Claude B. Hutchings
By
Attorney

Patented Nov. 4, 1952

2,616,392

UNITED STATES PATENT OFFICE 2,616,392

VETERINARY PEN

Claude B. Hutchings, Medical Lake, Wash.

Application December 24, 1949, Serial No. 134,900

4 Claims. (Cl. 119—98)

This invention relates to a veterinary pen and it is one object of the invention to provide a pen in which animals may be driven and confined while being operated upon for vaccination, inoculation, ringing, emasculation and the like.

Another object of the invention is to provide a pen having side walls which are pivotally mounted for swinging movement transversely of the pen into and out of position for gripping an animal from opposite sides and holding the animal while an operation or other treatment is being performed.

Another object of the invention is to provide a pen wherein the two side walls have operating mechanism including a single actuating lever by means of which the walls are caused to move into and out of a gripping position.

Another object of the invention is to provide a pen having a bottom or floor which is shiftable vertically from its normal position to a lowered position and thus allow an animal in the pen to be supported upon a bar extending longitudinally in the pen with its feet out of contact with the ground.

Another object of the invention is to provide means for shifting the bottom vertically including a single lever by means of which the vertical shifting movement is accomplished.

The invention is illustrated in the accompanying drawings wherein:

Fig. 1 is a perspective view of the improved veterinary pen.

Fig. 2 is a vertical sectional view taken transversely through the pen.

Figure 3:
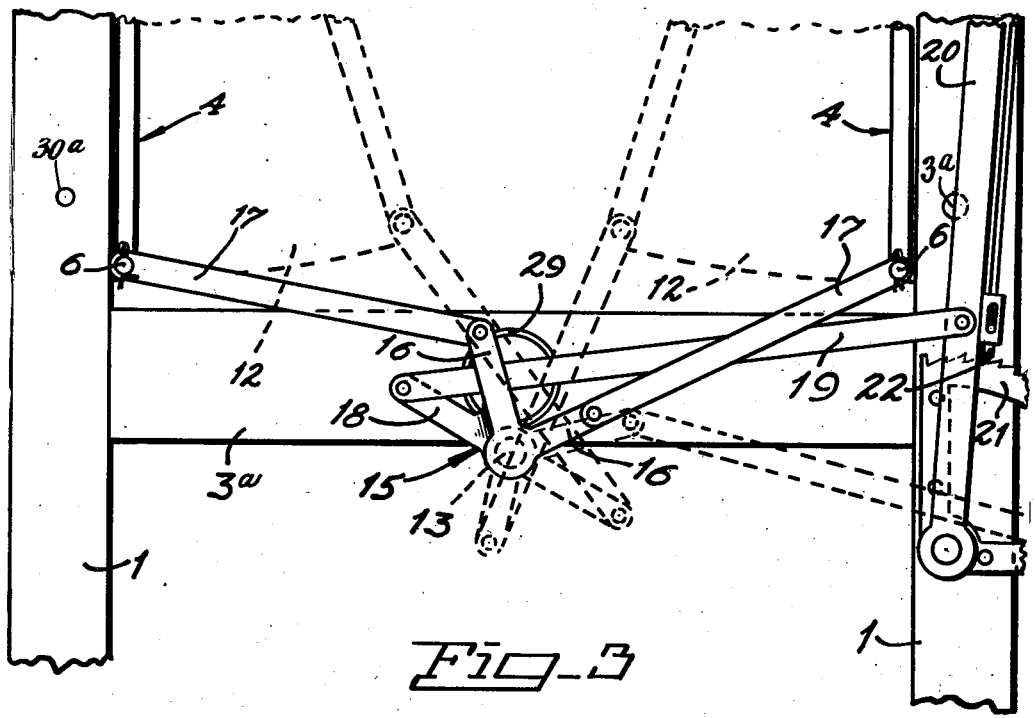
Fig. 3 is a fragmentary view upon an enlarged scale looking at one end of the pen and showing mechanism for adjusting side walls thereof.
Figure 4:
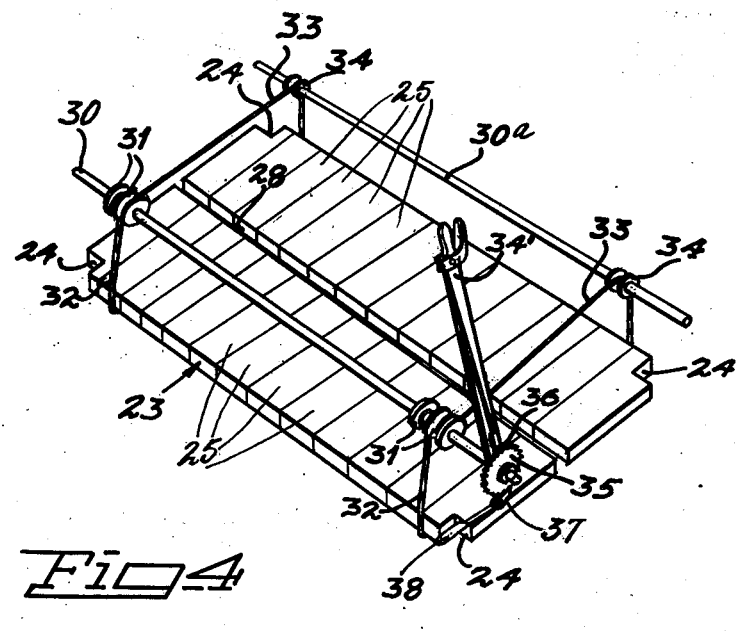
Fig. 4 is a perspective view upon a reduced scale of the bottom or floor and means for vertically adjusting the floor.

This improved veterinary pen is open at opposite ends and has front and rear corner posts 1 and 1ª to which are secured upper cross bars 2 and 2ª and lower cross bars 3 and 3ª which extend across the pen transversely thereof. Walls 4 extend longitudinally of the pen at opposite sides thereof and each has upper and lower rails 5 and 6 and vertically disposed rods or pickets 7 which are spaced transversely from each other longitudinally of the walls so that when the pen is in use a veterinary doctor may reach between the rods and into the pen. The upper rails or rods 5 have opposite end portions passed through opposite end portions of the upper cross bars and serving to pivotally mount the side walls 4 for swinging movement towards each other from the normal position shown in Figure 1, and in which an animal is released or free, to a gripping position in which the side walls have pressing and gripping engagement with opposite sides of an animal in the pen. Ends of the rods 5 are threaded and each carries a nut 8 and a washer 9 against which the nut bears.

A gang plank or ramp 10 leads to the entrance at the front end of the pen and a similar gang plank 11 leads from the rear end of the pen so that an animal may readily enter and leave the pen. If the side walls are not entirely moved to a vertical position when an animal is released and another driven towards the entrance at the front end of the pen, the animal may endeavor to force its way between the front corner posts 1 and the front ends of the side walls 4. In order to prevent this the side walls carry at their front ends wings 12 which gradually increase in width towards their lower ends and serve to block spaces between the front corner posts 1 and front ends of the side walls when the side walls are swung towards each other.

In order to swing the side walls 4 towards each other to a gripping position and back to a releasing position there has been provided operating mechanism having a shaft 13 which extends longitudinally of the pen and is rotatably mounted through bearings 14 carried by the lower cross bars 3 and 3ª. Spiders or bell crank levers 15 are rigidly mounted upon opposite ends of the shaft 13 and each has diverging arms 16 to which are pivoted inner ends of links 17 which have their outer ends pivoted to ends of the lower rails or rods 6 of the side walls 4. A third arm 18 is provided for the spider at the rear end of the pen and to this arm is pivoted the inner end of a link 19 which has its outer end pivoted to an actuating lever 20. This actuating lever is a latch lever and is pivotally mounted at its lower end to the adjacent rear corner post 1ª in cooperating relation to an arcuate rack 21 carried by the said corner post so that the pawl 22 of the latch lever may engage teeth of the rack and releasably hold the lever in a set position with the side walls in an adjusted position. Since the spiders are both rigidly fixed to the shaft 13 and turn with it the side walls will be simultaneously swung transversely of the pen to clamping or releasing positions.

An animal entering the pen walks onto a bottom or floor 23 which extends the full width and length of the pen and has at its corners recesses 24 into which fit inner edge portions of the posts 1 and 1ª. The floor is formed of planks 25 which extend transversely of the floor and are secured upon longitudinally extending inner and outer beams 26, 26a, the floor being braced by a suitable number of transversely extending truss rods 27. The transversely extending boards of the floor have inner ends spaced from each other to form a longitudinally extending channel or recess 28 midway the width of the floor and directly over this channel is a tubular bar 29 which has its ends mounted through openings in the lower cross bars 3 and 3a. Shafts 30 and 30a extend longitudinally of the pen at opposite sides thereof and have their end portions rotatably supported by posts 1 and 1a a short distance above the floor. Drums 31 are carried by the shaft 30 and about these drums are wound cables 32 and 33 which are secured to opposite side edge portions of the floor. The cables 33 extend transversely across the pen close to the lower cross bars 3 and 3a and are trained about pulleys 34 carried by the rod or shaft 30a at the opposite side of the pen from the drums 31 before being extended downwardly and secured to the floor. A latch lever 34' is loosely mounted upon the shaft 30 and upon this shaft is rigidly mounted a ratchet wheel 35 having its teeth engaged by the pawl 36 of the latch lever so that when the latch lever is rocked upon the shaft 30, the shaft will be turned and the cables wound about the drums and draw the floor upwardly to its raised position close to the under surface of the pipe or tubular bar 29 where it is held by a pawl or dog 37 pivoted to one corner post. This dog has a handle 38 by means of which it may be tilted to a releasing position and allow the cables to unwind from the drums and the floor move downwardly to a lowered position. It will thus be seen that an animal may be driven into the pen and stand upon the floor and either immediately clamped by shifting the side walls inwardly to a clamping position or the floor may be released after the animal has entered the pen and the animal lowered to a position in which the bar 29 extends longitudinally of the animal between its legs and the animal's stomach rests upon the bar. The animal's feet will then be out of engagement with the floor and when the side walls are swung inwardly to a clamping position the animal will be firmly held and can not jump upwardly or to one side or the other in attempting to escape from the pen. Since the side walls have vertical slats or rods 7 which are spaced transversely from each other a veterinary doctor may thrust his hands and arms into the pen and conveniently reach the animal for performing various operations. After an operation has been completed the floor is returned to its raised position in which the animal's feet rest upon the floor and the side walls then swung outwardly to a releasing position. The animal may then walk out of the pen.

Having thus described the invention, what is claimed is:

1. A veterinary pen open at front and rear ends and comprising front and rear end walls each having side posts and upper and lower cross bars, the lower cross bars being spaced upwardly from lower ends of the posts, side walls extending between said end walls, a bottom extending between said end walls and under the side walls, said bottom being free from said posts and slidable along lower portions of the posts from a lowered position below the lower cross bars to a raised position between the lower cross bars, means for shifting said bottom vertically and supporting it in its raised and lowered positions, and a bar extending longitudinally in said pen over said bottom and supported by said lower cross bar midway the width of the bottom in position to extend longitudinally between front and rear legs of an animal and support the animal by contact with the animal's stomach when the bottom is in a lowered position.

2. A veterinary pen open at front and rear ends and comprising end walls consisting of side posts and upper and lower cross bars extending between the posts, side walls extending between said end walls and at ends of their upper edges being pivoted to said posts for swinging movement transversely of the pen into and out of a clamping position, lateral wings extending outwardly from ends of said side walls at the front end of the pen, mechanism carried by one end wall and connected with adjacent ends of the side walls for swinging the side walls transversely of the pen to adjusted positions, and holding the side walls in the adjusted positions, and a floor for said pen mounted between the end walls and having side portions extending under the side walls.

3. A veterinary pen open at front and rear ends and comprising end walls consisting of side posts and upper and lower cross bars carried by the posts, the lower cross bars being spaced upwardly from lower ends of said posts, side walls mounted between said end walls, a floor for the pen extending between the end walls and having side portions disposed under the side walls, said floor being free from the walls and having corner portions slidable vertically along said post and serving to guide vertical movement of the floor to raised and lowered positions, a bar extending longitudinally in said pen above said floor and rigidly supported between the lower cross bars midway the width of the crib and constituting a support for extending longitudinally between front and rear legs of an animal in supporting contact with the animal's stomach when the floor is moved to a lowered position disposing an animal's feet out of contact with the floor, a shaft rotatably mounted between the end walls in position above the floor, drums carried by said shaft, cables wound about the drums and connected with opposite side edge portions of the floor, and means for rotating said shaft and thereby turning the drums to raise and lower the floor.

4. A veterinary pen open at front and rear ends and comprising end walls each consisting of side posts and upper and lower cross bars, the lower cross bars being spaced upwardly from lower ends of said posts, side walls mounted between said end walls, a floor extending between the end walls and having side portions projecting outwardly under the side walls and slidable vertically along lower portions of the posts from a raised position between the lower cross bars to a lowered position upon the ground, a bar extending longitudinally in said pen over the floor and supported by the lower cross bar in position for extending longitudinally between front and rear legs of an animal and engaging the animal's stomach and support the animal when the floor is in a lowered position disposing the animal's feet out of contact with the floor, shafts extending longitudinally of said pen over outwardly projecting opposite side edge portions of the floor and rotatably supported by front and rear posts, drums carried by one shaft, cables wound upon said drums and connected to opposite side edge portions of the floor, pulleys carried by the other shaft and about which the cables are trained, a latch lever loosely carried by the drum-carrying shafts, a ratchet wheel rigidly carried by the drum-carrying shaft and engaged pawl of the latch lever for rotating the ratchet wheel and the said drum-carrying shaft in a direction to wind the cables upon the drums and raise the floor, and a latch carried by the floor and movable into and out of position for engaging the ratchet wheel and holding the floor in its raised position.

CLAUDE B. HUTCHINGS.

REFERENCES CITED

The following references are of record in the file of this patent:

UNITED STATES PATENTS

| Number | Name | Date |
| --- | --- | --- |
| 888,001 | Crapnell | May 19, 1908 |
| 1,353,376 | Barlow | Sept. 21, 1920 |
| 1,375,189 | Tucker | Apr. 19, 1921 |
| 2,396,928 | Parsons | Jan. 23, 1945 |